US012553414B2

(12) United States Patent
Trede

(10) Patent No.: US 12,553,414 B2
(45) Date of Patent: Feb. 17, 2026

(54) SPRING-MOUNTED GEARBOX HOUSING

(71) Applicants: ZF FRIEDRICHSHAFEN AG, Friedrichshafen (DE); ZF WIND POWER ANTWERPEN N.V., Lommel (BE)

(72) Inventor: Alf Trede, Immenstedt (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 18/865,347

(22) PCT Filed: Apr. 19, 2023

(86) PCT No.: PCT/EP2023/060065
§ 371 (c)(1),
(2) Date: Nov. 13, 2024

(87) PCT Pub. No.: WO2023/222319
PCT Pub. Date: Nov. 23, 2023

(65) Prior Publication Data
US 2025/0198388 A1    Jun. 19, 2025

(30) Foreign Application Priority Data
May 17, 2022    (DE) .............. 10 2022 204 900.4

(51) Int. Cl.
F03D 80/80        (2016.01)
F03D 15/10        (2016.01)
(Continued)

(52) U.S. Cl.
CPC ........... *F03D 15/10* (2016.05); *F03D 80/881* (2023.08); *F16H 57/021* (2013.01);
(Continued)

(58) Field of Classification Search
CPC ........ F03D 15/10; F03D 80/88; F03D 80/881; F05B 2260/964; F16H 2057/02078
See application file for complete search history.

(56) References Cited

U.S. PATENT DOCUMENTS 9,347,543 B2 *   5/2016   Trede ............... F03D 80/70
9,366,330 B2     6/2016   Trede
(Continued)

FOREIGN PATENT DOCUMENTS

CN    103075461 A    5/2013
DE    102010009863 A1    9/2011
(Continued)

*Primary Examiner* — Nathaniel E Wiehe
*Assistant Examiner* — Jason G Davis
(74) *Attorney, Agent, or Firm* — LEYDIG, VOIT & MAYER, LTD.

(57) ABSTRACT

An arrangement for fixing a housing of a wind turbine gearbox in a nacelle, including a housing-fixing means, a nacelle-fixing means, and at least two spring devices. The spring devices support the housing-fixing means against the nacelle-fixing means in opposite directions along a support axis. The spring devices are arranged on different sides of a plane extending parallel to an axis of rotation of an input shaft of the wind turbine gearbox.

13 Claims, 4 Drawing Sheets

(51) Int. Cl.
   *F16H 57/02*     (2012.01)
   *F16H 57/021*    (2012.01)
   *F16H 57/025*    (2012.01)

(52) U.S. Cl.
   CPC .... *F16H 57/025* (2013.01); *F05B 2260/4031* (2013.01); *F16H 2057/02078* (2013.01)

(56) References Cited

U.S. PATENT DOCUMENTS

| | | | |
|---|---|---|---|
| 9,523,356 B2 * | 12/2016 | Michalski | F01D 25/28 |
| 10,947,958 B2 | 3/2021 | Eusterbarkey et al. | |
| 11,255,313 B2 * | 2/2022 | Wertz | F03D 15/00 |
| 2008/0308980 A1 | 12/2008 | Mitsch | |
| 2013/0195654 A1 | 8/2013 | Berger et al. | |

FOREIGN PATENT DOCUMENTS

| | | |
|---|---|---|
| EP | 1564406 A2 | 8/2005 |
| JP | 2013144970 A | 7/2013 |
| WO | WO 2019121111 A1 | 6/2019 |

* cited by examiner

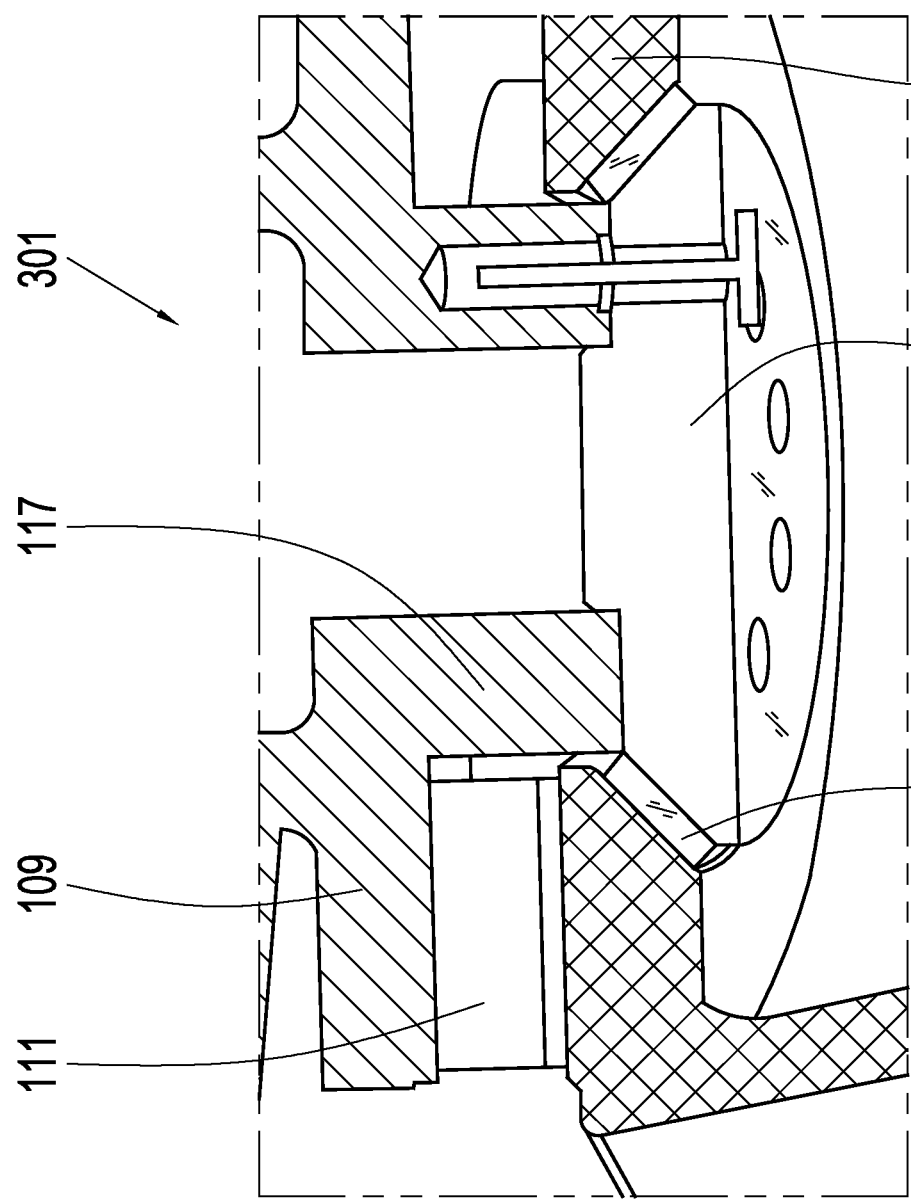

SPRING-MOUNTED GEARBOX HOUSING

CROSS REFERENCE TO RELATED APPLICATIONS

This application is a U.S. National Phase application under 35 U.S.C. § 371 of International Application No. PCT/EP2023/060065, filed on Apr. 19, 2023, and claims benefit to German Patent Application No. DE 10 2022 204 900.4, filed on May 17, 2022. The International Application was published in German on Nov. 23, 2023 as WO 2023/222319 A1 under PCT Article 21(2).

FIELD

The invention relates to an arrangement for fixing a housing of a wind turbine gearbox in a nacelle and a wind turbine with a gearbox and a nacelle.

BACKGROUND

Arrangements are known from the prior art for fixing a housing of a wind turbine gearbox in a nacelle of the wind turbine in a spring-mounted manner. Thereby the housing is supported in the nacelle by cylindrical elastomers. A central axis of the elastomers is aligned parallel to an axis of rotation of an input shaft of the gearbox.

SUMMARY

In an embodiment, the present disclosure provides an arrangement for fixing a housing of a wind turbine gearbox in a nacelle, comprising a housing-fixing means, a nacelle-fixing means, and at least two spring devices. The spring devices support the housing-fixing means against the nacelle-fixing means in opposite directions along a support axis. The spring devices are arranged on different sides of a plane extending parallel to an axis of rotation of an input shaft of the wind turbine gearbox.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 illustrates an arrangement with a hollow truncated cone-shaped elastomer.

DETAILED DESCRIPTION

Figure 1:
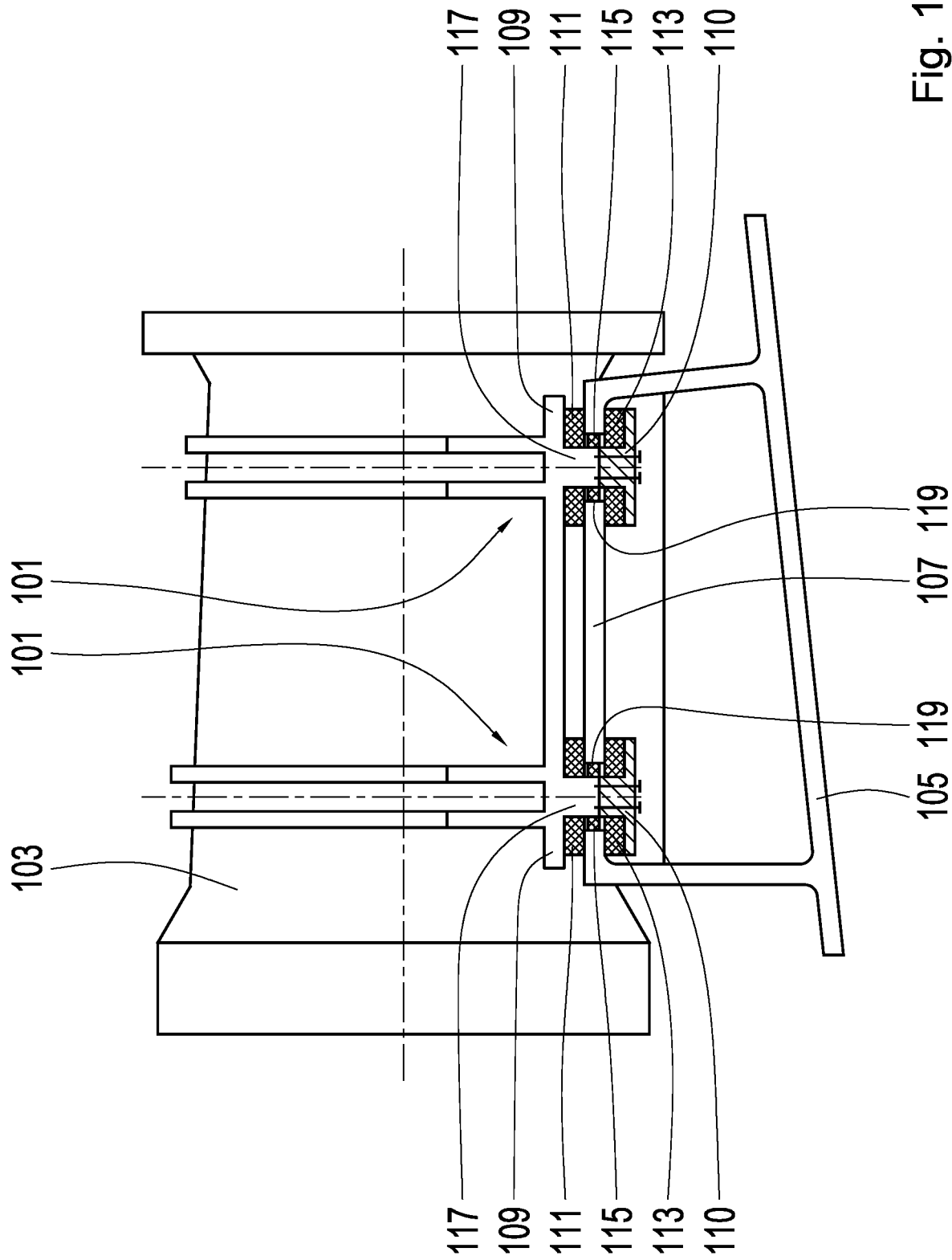
FIG. 1 illustrates a spring-mounted drivetrain of a wind turbine.

In an embodiment, the present invention improves the fixing of a housing of a wind turbine gearbox in a nacelle. This is achieved by an arrangement and a wind turbine as disclosed herein. Preferred further embodiments are contained in the following description.

The arrangement according to an embodiment of the invention serves to fix a housing of a wind turbine gearbox, i.e. a gearbox intended for use in a wind turbine, in a nacelle of the wind turbine. One wall of the housing encapsulates a cavity in which the internals of the gearbox, such as shafts, bearings and gears, are located. For example, the housing can encapsulate a rotor shaft and/or input shaft of the gearbox and its bearings.

The term nacelle refers to a device for receiving the drivetrain of a wind turbine. The nacelle comprises a support structure for fixing the drivetrain, in particular for fixing a gearbox contained in the drivetrain.

The arrangement according to an embodiment of the invention includes a housing-fixed means, a nacelle-fixed means and at least two spring devices—a first spring device and a second spring device.

A housing-fixed means refers to a means that is fixedly connected to the housing, i.e. without the possibility of relative movement. Analogously, a nacelle-fixed means refers to a means that is fixedly connected to the nacelle.

A spring device is a device consisting of one or more spring elements. Elastomers, i.e. means consisting of an elastomer, or hydro-mounts are used as spring elements.

The first spring device and the second spring device support the housing-fixed means against the nacelle-fixed means. They therefore connect the housing-fixed means to the nacelle-fixed means in a force-conducting and resilient manner. For this purpose, the first spring device and the second spring device are preferably joined to the housing-fixed means and/or the nacelle-fixed means.

The spring devices support the housing-fixed means in opposite directions along a support axis against the nacelle-fixed means. The first spring device therefore supports the housing-fixed means against the nacelle-fixed means in a first direction. The second spring device supports the housing-fixed means against the nacelle-fixed means in a second direction. The first direction and the second direction are opposite each other. If the first spring device is compression-loaded, the second spring device is tension-loaded in the opposite direction. Conversely, if the second spring device is compression-loaded, the first spring device is tension-loaded in the opposite direction. The support axis preferably runs orthogonally to an axis of rotation of an input shaft of the wind turbine gearbox.

According to an embodiment of the invention, the spring devices are arranged on different sides of a plane. The plane runs parallel to the axis of rotation of the input shaft of the wind turbine gearbox. In particular, the plane can include the axis of rotation of the input shaft. Preferably, the plane is aligned orthogonally to the support axis.

The directions of the forces with which the spring devices are loaded depend on the axis of rotation of the input shaft. In particular, the direction of a drive torque, which is supported in the spring devices, and the direction of a weight force of the wind power gearbox, which is introduced into the nacelle via the spring devices, depend on the course of the axis of rotation. Due to the alignment of the plane according to embodiments of the invention and the arrangement of the spring devices depending therefrom, one spring device is essentially compression-loaded and the other essentially tension-loaded. The choice and configuration of the spring device therefore enables improved adaptation to the forces to be supported. In particular, the behavior of the arrangement is optimizable with regard to vibration loads.

In an embodiment, the first spring device and/or the second spring device are turn-symmetrical i.e. rotationally symmetrical with respect to the support axis. This means that the first spring device and/or the second spring device have a shape that can be mapped onto itself by rotation through at least one angle about the support axis. In particular, the first spring device and/or the second spring device can be rotationally symmetrical in the narrower sense. In this case, the shape of the first spring device and/or the second spring device can be mapped onto itself by rotating it through any angle about the support axis.

Due to the rotational symmetry of the first spring device and/or the second spring device, a particularly simple structure of the arrangement is obtained. This simplifies the configuration of the spring devices described above.

Preferably, the first spring device and the second spring device are mirror-symmetrical to each other with respect to the above-mentioned plane. This allows the first spring device and the second spring device to be interchanged. As a result, the variety of components is reduced, which leads to cost savings.

The first spring device is fixed in a first part of the housing-fixed means. Correspondingly, the second spring device is fixed in a second part of the housing-fixed means. The mirror-symmetrical further embodiment requires that the first part and the second part of the housing-fixed means are also mirror-symmetrical to one another with respect to the above-mentioned plane.

In an embodiment, the above-mentioned plane intersects the housing-fixed means and/or the nacelle-fixed means. If the plane intersects the housing-fixed means, this results in a structure of the arrangement with spring devices that are arranged on different sides of the housing-fixed means. Conversely, if the plane intersects the nacelle-fixed means, this results in a structure with spring devices that are arranged on different sides of the nacelle-fixed means.

Furthermore, an arrangement of a part of the nacelle-fixed means between the first spring device and the second spring device and between a first part and a second part of the housing-fixed means is preferred. Thereby the first spring device is arranged between the first part of the housing-fixed means and the part of the nacelle-fixed means and/or is braced between the first part of the housing-fixed means and the part of the nacelle-fixed means. Analogously, the second spring device is arranged between the second part of the housing-fixed means and the part of the nacelle-fixed means and/or braced between the second part of the housing-fixed means and the part of the nacelle-fixed means.

Alternatively, the arrangement can be further configured such that a part of the housing-fixed means is arranged between the spring devices and between a first part and a second part of the nacelle-fixed means, wherein the first spring device is arranged and/or braced between the first part of the nacelle-fixed means and the part of the housing-fixed means, and wherein the second spring device is arranged and/or braced between the second part of the nacelle-fixed means and the part of the housing-fixed means.

In preferred further embodiments, the nacelle-fixed means is arranged at least partially between the spring devices and a first part and a second part of the housing-fixed means. This results mutatis mutandis, i.e. an exchange of the nacelle-fixed means and the housing-fixed means, in alternative further embodiments relating to an arrangement in which at least a part of the housing-fixing means is arranged between the spring devices and between a first part and a second part of the nacelle-fixed means.

Preferably, the housing-fixed means is further configured with a connecting element. This connects the first part and the second part of the housing-fixed means with each other. The connecting element therefore runs between the first part and the second part and merges into the first part and/or the second part at the respective connection point. In particular, the transition can be configured integrally. In this case, the connecting element is connected in one piece to the first part and the second part of the housing-fixed means. The connecting element has a cylindrical configuration, for example. In particular, it can have the shape of a right circular cylinder.

According to an embodiment, the nacelle-fixed means has a recess. This is configured as a continuous hole through which the connecting element runs. Accordingly, the recess encloses the connecting element. Since the connecting element connects the first part and the second part of the housing-fixed means, these are located on different sides of the recess.

Furthermore, the arrangement is preferably further configured with a third spring device. This serves to support the housing-fixed means against the nacelle-fixed means orthogonally to the support axis.

According to an embodiment, the third spring device is arranged at least partially in the recess of the nacelle-fixed means. For its part, the third spring device has a recess which is configured as a continuous hole through which the connecting element runs.

The third spring device is advantageous, as the third spring device can be configured independently of the first spring device and the second spring device. This makes it possible to support the housing-fixed means against the nacelle-fixed means in the orthogonal direction with a specifically adapted spring element, while the properties of the original support by the first spring device and the second spring device remain unchanged.

Preferably, the first spring device and/or the second spring device are each configured in the shape of a hollow truncated cone. A hollow truncated cone is a truncated cone with a cavity. The cavity also has the shape of a truncated cone.

Due to the hollow truncated cone shaped embodiment, the first spring device and/or the second spring device can support the housing-fixed means both axially and radially against the nacelle-fixed means. This eliminates the need for a third spring device.

The hollow truncated cone-shaped first spring device and second spring device are preferably directed towards each other with their tapered ends. In an embodiment, the first spring device and the second spring device therefore have the shape of a hollow truncated cone which tapers in each case in the direction of the other spring device. The hollow truncated cone, which describes the shape of the first spring device, therefore tapers in the direction of the second spring device. Conversely, the hollow truncated cone, which describes the shape of the second spring device, tapers in the direction of the first spring device. This results in a form-fit fixing of the nacelle-fixed means between the spring devices.

In an embodiment, the nacelle-fixed means comprises a first part and a second part. The first part and the second part form physically separate pieces, i.e. are not integrally connected to one another. Furthermore, the first part and the second part are joined together, preferably detachably.

The first spring device supports the housing-fixed means against the first part. Accordingly, the second spring device supports the housing-fixed means against the second part. In particular, the first spring device can support the first part of the housing-fixed means against the first part of the nacelle-fixed means, wherein the second spring device supports the second part of the housing-fixed means against the second part of the nacelle-fixed means.

Due to the two-part configuration of the nacelle-fixed means and, if necessary, of the housing-fixed means the assembly of the arrangement is possible in a simplified way and, in the case of a detachable joint connection, also the disassembly.

A wind turbine according to an embodiment of the invention has a gearbox and a nacelle. The wind turbine can also have three or four arrangements of the type described above, with which a housing of the gearbox is fixed in the nacelle.

Preferably, the wind turbine is further configured in such a way that the first spring device and the second spring device of the three or four arrangements are each arranged on different sides of the same plane running parallel to the axis of rotation of the input shaft of the gearbox. This results in a particularly simple configuration of the housing-fixed means. In particular, it is possible to use a plate-shaped component which forms the nacelle-fixing means of at least two of the arrangements, preferably all of the three or four arrangements.

Preferred exemplary embodiments of the invention are shown in the figures. Corresponding reference numerals indicate identical or functionally identical features.

FIG. 1 shows gearbox mountings 101 with a cylindrical basic shape. By means of the gearbox mountings 101, a housing 103 is fixed in a nacelle-fixed machine carrier 105. The main shaft of a wind turbine is mounted in the housing 103. The main shaft connects a rotor of the wind turbine to the input shaft of a gearbox in a non-rotatable manner.

The machine carrier 105 has a plate 107. This plate, together with a housing-fixed support foot 109, a counter-holder 110 and three elastomers 111, 113, 115, forms a gearbox mounting 101.

The elastomers 111, 113, 115 each have the shape of a hollow cylinder, i.e. a cylinder with a cylindrical cavity. A bolt 117 formed by the support foot 109 and the counter-holder 110 extends through the cavities of the elastomers 111, 113, 115. The bolt 117 connects the support foot 109 to the counter-holder 110. It is configured in two parts for assembly and disassembly purposes.

A first elastomer 111 is arranged between the support foot 109 and the plate 107. In this way, the support foot can be supported by the elastomer 111 in a first direction in the plate 107.

The counter-holder 110 is arranged on a side of the plate 107 opposite the support foot 109. A second elastomer 113 is located between the counter-holder 110 and the plate 107. The counter-holder 110 can be supported by the second elastomer 113 in a second direction in the plate 107 opposite to the first direction. By arranging the support foot 109 and the counter-holder 110 on opposite sides of the plate 107, the housing 103 is fixed in the first direction and the second direction in the plate 107 via the first elastomer 111 and the second elastomer 113.

A third elastomer 115 serves for fixing orthogonally thereto. This is located in a recess 119 of the plate 107. The bolt 117 is supported against the recess 119 via the third elastomer 115.

Figure 2:
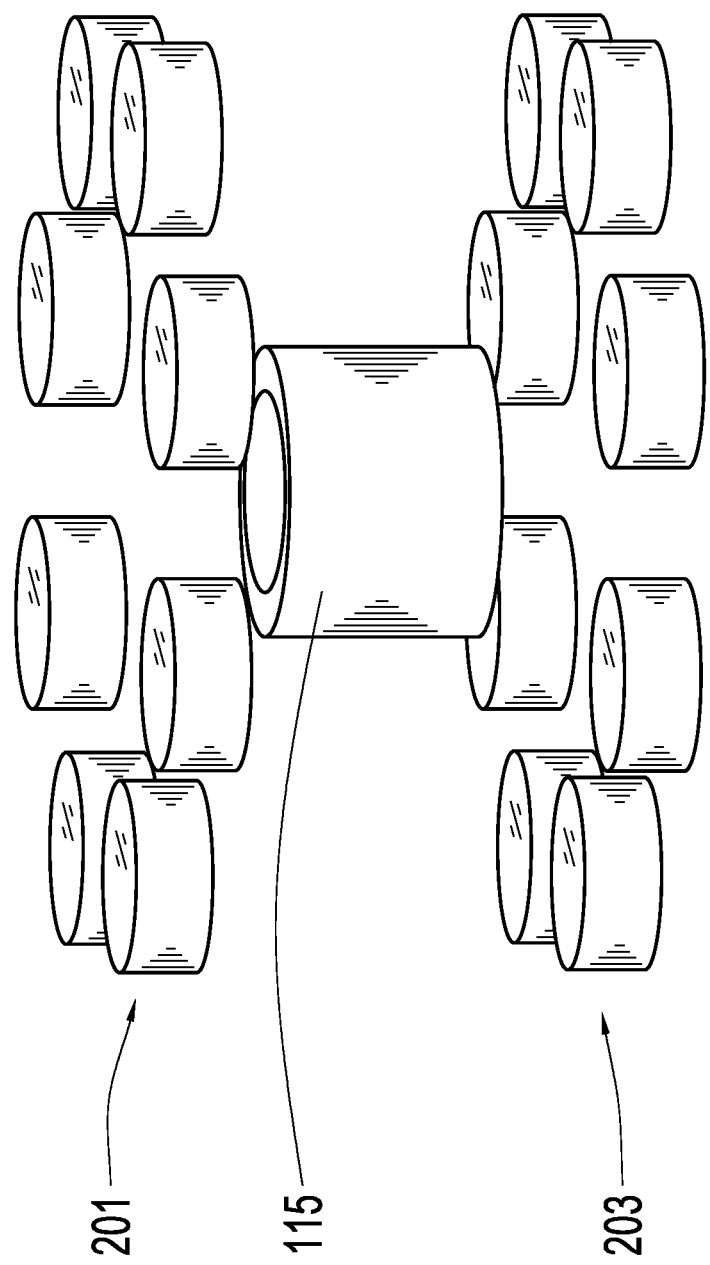
FIG. 2 illustrates spring elements of a spring device.

Instead of a single, integrally configured first elastomer 111 and a second, equally integrally configured second elastomer 113, several elastomers can be used, as shown in FIG. 2. The elastomers are arranged in two groups—a first group 201 and a second group 203.

The elastomers of the first group 201 are located between the support foot 109 and the plate 107. They are grouped rotationally symmetrically around the bolt 107 and assume the function of the first elastomer 111 from FIG. 1.

The elastomers of the second group 203 are arranged between the counter-holder 110 and the plate 107. They are also grouped rotationally symmetrically around the bolt 117. Accordingly, the elastomers of the second group 203 assume the function of the second elastomer 113 from FIG. 1.

A gearbox mounting 301 shown in FIG. 3 does not require a third elastomer 115. This is achieved by configuring the second elastomer 113 as a hollow truncated cone. A bearing surface in the plate 107 and the counter-holder 111 is in each case configured accordingly, i.e. having the shape of a lateral surface of a truncated cone.

The second elastomer 113 can absorb forces in the axial and radial directions due to its hollow truncated cone configuration. The first elastomer 111, on the other hand, has a hollow cylindrical shape in accordance with FIG. 1.

Figure 4A:
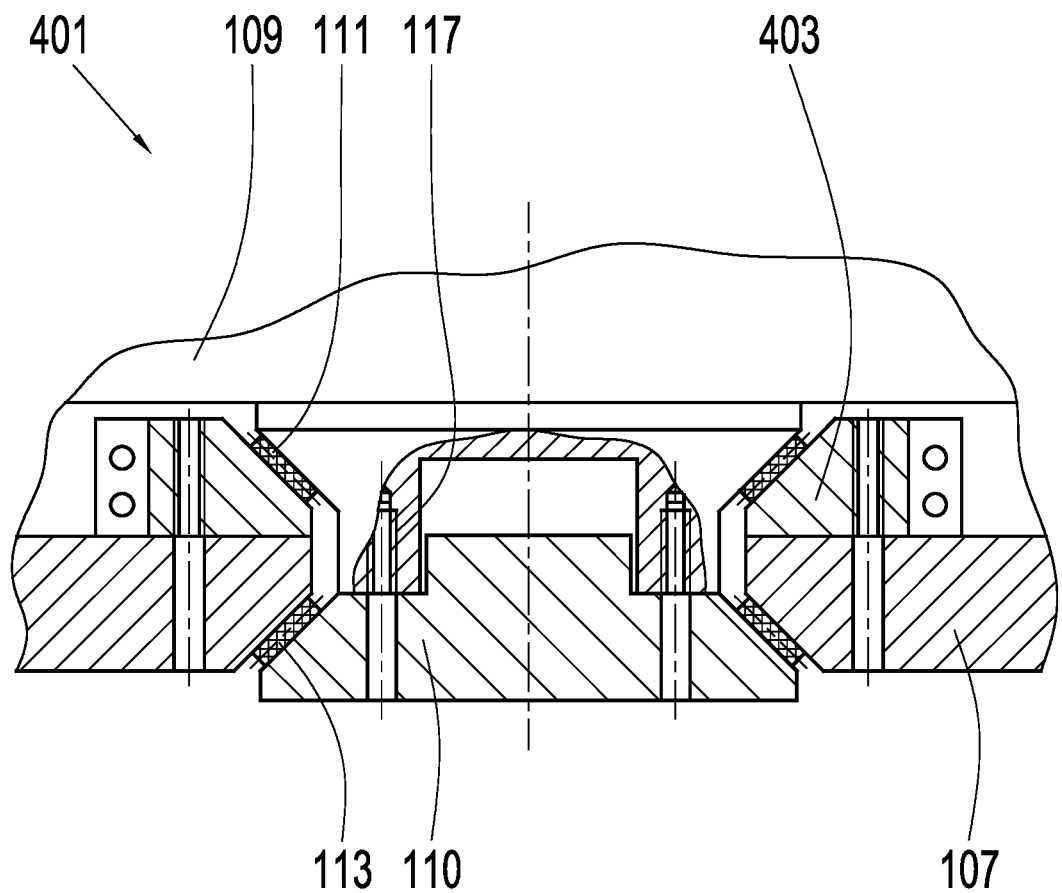
FIGS. 4A and 4B illustrate an arrangement with two hollow cone-shaped elastomers.
Figure 4B:
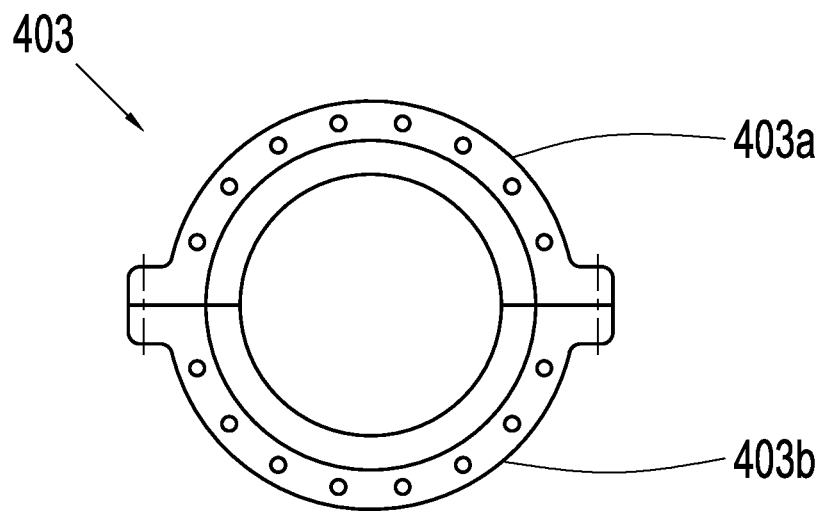

In a gearbox mounting 401 shown in FIGS. 4A and 4B, the first elastomer 111 is also configured like a hollow truncated cone in addition to the second elastomer 113. Here, too, there is no third elastomer 115, since the first elastomer 113 and the second elastomer 111 can also absorb radial forces due to their hollow cone-shaped configuration. The gearbox mounting 401 according to FIGS. 4A and 4B thus has exactly two elastomers—the first elastomer 111 and the second elastomer 113—as does the gearbox mounting 301 according to FIG. 3.

A support flange 403 for the first elastomer 111 is attached on the plate 107. This is screwed to the plate 107. The first elastomer 111 is braced between the support flange 403 and the support foot 109.

The support flange 401 is configured in two parts. It consists of a first half 403a and a second half 403b. The two halves 403a, 403b are screwed together. This allows the support flange 401 to be easily assembled and disassembled. In particular, the support flange 401 can also be subsequently removed for repair and maintenance purposes.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

List of Reference Numerals 101 gearbox mounting
103 housing 105 machine carrier
107 plate
109 support foot
110 counter-holder
111 elastomer
113 elastomer
115 elastomer
117 bolt
119 recess
201 first group of elastomers
203 second group of elastomers
301 gearbox mounting
401 gearbox mounting
403 support flange
403a first half of the support flange
403b second half of the support flange

The invention claimed is:

1. An arrangement for fixing a housing of a wind turbine gearbox in a nacelle, comprising:
a housing-fixing means;
a nacelle-fixing means; and
at least two spring devices,
wherein the spring devices support the housing-fixing means against the nacelle-fixing means in opposite directions along a support axis,
wherein the spring devices are arranged on different sides of a plane extending parallel to an axis of rotation of an input shaft of the wind turbine gearbox,
wherein a portion of the nacelle-fixing means is arranged between the spring devices and between a first part and a second part of the housing-fixing means,
wherein a first spring device of the spring devices is arranged between the first part of the housing-fixing means and the portion of the nacelle-fixing means arranged between the spring devices,
wherein a second spring device of the spring devices is arranged between the second part of the housing-fixing means and the portion of the nacelle-fixing means, and
wherein the housing-fixing means has a connector which connects the first part and the second part of the housing-fixing means to each other and which extends through a recess of the nacelle-fixing means.

2. The arrangement according to claim 1, wherein at least one of the at least two spring devices is rotationally symmetrical with respect to the support axis.

3. The arrangement according to claim 1, wherein the spring devices are mirror-symmetrical to one another with respect to the plane.

4. The arrangement according to claim 1, wherein the plane intersects the housing-fixing means and/or the nacelle-fixing means.

5. The arrangement according to claim 1; comprising a third spring device arranged at least partially in the recess, wherein the connector extends through a recess of the third spring device.

6. The arrangement according to claim 1, wherein the first spring device and/or the second spring device have a shape of a hollow truncated cone.

7. The arrangement according to claim 6, wherein the first spring device has the shape of a hollow truncated cone which tapers in a direction of the second spring device, and wherein the second spring device has the shape of a hollow truncated cone which tapers in a direction of the first spring device.

8. The arrangement according to claim 1, wherein the first part and the second part of the housing-fixing means are configured as physically separate pieces and joined together, and
wherein the first spring device supports the first part and the second spring device supports the second part against the nacelle-fixing means.

9. The arrangement according to claim 1, wherein the nacelle-fixing means comprises a first nacelle-fixing part and a second nacelle-fixing part,
wherein the first nacelle-fixing part and the second nacelle-fixing part form physically separate parts and are joined together, and
wherein the first spring device supports the housing-fixing means against the first nacelle-fixing part and the second spring device supports the housing-fixing means against the second nacelle-fixing part.

10. A wind turbine with a gearbox and a nacelle, comprising a total of three or four of the arrangements according to claim 1, wherein a housing of the wind turbine gearbox with the arrangements is fixed in the nacelle.

11. The wind turbine according to claim 10, wherein a first spring device of the spring devices and a second spring device of the spring devices of the three or four arrangements are each arranged on different sides of the same plane extending parallel to the axis of rotation of the input shaft of the wind turbine gearbox.

12. An arrangement for fixing a housing of a wind turbine gearbox in a nacelle, comprising:
a housing-fixing means;
a nacelle-fixing means; and
at least two spring devices,
wherein the spring devices support the housing-fixing means against the nacelle-fixing means in opposite directions along a support axis,
wherein the spring devices are arranged on different sides of a plane extending parallel to an axis of rotation of an input shaft of the wind turbine gearbox,
wherein a portion of the nacelle-fixing means is arranged between the spring devices and between a first part and a second part of the housing-fixing means,
wherein a first spring device of the spring devices is arranged between the first part of the housing-fixing means and the portion of the nacelle-fixing means arranged between the spring devices,
wherein a second spring device of the spring devices is arranged between the second part of the housing-fixing means and the portion of the nacelle-fixing means, and
wherein the first spring device and/or the second spring device have a shape of a hollow truncated cone.

13. An arrangement for fixing a housing of a wind turbine gearbox in a nacelle, comprising:
a housing-fixing means;
a nacelle-fixing means; and
at least two spring devices,
wherein the spring devices support the housing-fixing means against the nacelle-fixing means in opposite directions along a support axis,
wherein the spring devices are arranged on different sides of a plane extending parallel to an axis of rotation of an input shaft of the wind turbine gearbox,
wherein a portion of the nacelle-fixing means is arranged between the spring devices and between a first part and a second part of the housing-fixing means,
wherein a first spring device of the spring devices is arranged between the first part of the housing-fixing means and the portion of the nacelle-fixing means arranged between the spring devices,
wherein a second spring device of the spring devices is arranged between the second part of the housing-fixing means and the portion of the nacelle-fixing means,
wherein the nacelle-fixing means comprises a first nacelle-fixing part and a second nacelle-fixing part,
wherein the first nacelle-fixing part and the second nacelle-fixing part form physically separate parts and are joined together, and
wherein the first spring device supports the housing-fixing means against the first nacelle-fixing part and the second spring device supports the housing-fixing means against the second nacelle-fixing part.

* * * * *